(12) United States Patent
Yang (10) Patent No.: US 9,971,941 B2
(45) Date of Patent: May 15, 2018

(54) PERSON COUNTING METHOD AND DEVICE FOR SAME

(71) Applicant: SK TELECOM CO., LTD., Seoul (KR)

(72) Inventor: Seungji Yang, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days. days.

(21) Appl. No.: 15/108,784

(22) PCT Filed: Oct. 22, 2014

(86) PCT No.: PCT/KR2014/009926
§ 371 (c)(1),
(2) Date: Jun. 29, 2016

(87) PCT Pub. No.: WO2015/126031
PCT Pub. Date: Aug. 27, 2015

(65) Prior Publication Data
US 2016/0321507 A1 Nov. 3, 2016

(30) Foreign Application Priority Data

Feb. 24, 2014 (KR) ........................ 10-2014-0021381

(51) Int. Cl.
*G06K 9/00* (2006.01)
*G06K 9/46* (2006.01)
(Continued)

(52) U.S. Cl.
CPC ..... *G06K 9/00778* (2013.01); *G06K 9/00335* (2013.01); *G06K 9/4604* (2013.01);
(Continued)

(58) Field of Classification Search
None
See application file for complete search history.

(56) References Cited

U.S. PATENT DOCUMENTS

2005/0201612 A1* 9/2005 Park ................. G06K 9/00778
382/154
2012/0020518 A1* 1/2012 Taguchi ................ G06T 7/292
382/103
(Continued)

FOREIGN PATENT DOCUMENTS

JP 2010198566 A 9/2010
KR 1020120053949 A 5/2012

OTHER PUBLICATIONS

Bradley, D et al., "Adaptive Thresholding Using Integral Image", In: The Journal of Graphics Tools, NRC 48816, vol. 12, Issue 2, 2007, 7 pages.
(Continued)

*Primary Examiner* — Randolph I Chu
(74) *Attorney, Agent, or Firm* — Hauptman Ham, LLP (57) ABSTRACT

A method for counting a number of people includes detecting a foreground contour from a current frame inputted, performing a head detection by defining a baseline virtually at a point perpendicular to a center point of a camera-captured area, by defining a search area around the baseline, and by detecting, as as candidate heads, circular contours to be recognized as heads of people at a point where the foreground contour crosses the baseline, tracking the candidate heads respectively in subsequent frames until the candidate heads pass through the search area, and counting up the number of people by the candidate heads that respectively pass through the search area.

19 Claims, 9 Drawing Sheets

(51) Int. Cl.
 G06K 9/66 (2006.01)
 G06K 9/52 (2006.01)
 G06K 9/62 (2006.01)
 G06T 7/60 (2017.01)
 G06T 7/246 (2017.01)
(52) U.S. Cl.
 CPC ............. *G06K 9/52* (2013.01); *G06K 9/6215* (2013.01); *G06T 7/246* (2017.01); *G06T 7/60* (2013.01); *G06T 2207/30196* (2013.01); *G06T 2207/30242* (2013.01)

(56) References Cited

U.S. PATENT DOCUMENTS

| | | | |
|---|---|---|---|
| 2013/0070969 A1 | 3/2013 | Hu et al. | |
| 2013/0148848 A1* | 6/2013 | Lee | G06K 9/00771 382/103 |
| 2013/0182915 A1* | 7/2013 | Hanna | A61B 5/117 382/116 |
| 2013/0232514 A1 | 9/2013 | Luff | |
| 2013/0236058 A1 | 9/2013 | Wang et al. | |
| 2014/0226855 A1* | 8/2014 | Savvides | G06K 9/00771 382/103 |
| 2014/0327780 A1* | 11/2014 | Herrli Anderegg | G08B 13/19645 348/159 |

OTHER PUBLICATIONS

Lee et al., "Adaptive thresholding for two-dimensional barcode images using two thresholds and the integral image", In: Open Access, vol. 16, Issue 11, 2012, 6 pages.

International Search Report dated Jan. 16, 2015 corresponding to International Application No. PCT/KR2014/009926.

* cited by examiner

```
procedure AdaptiveThreshold (in, out, w, h)
for i = 0 to w do
  sum ← 0
  for j = 0 to h do
    sum ← sum+in[i, j]
    if i = 0 then intImg[i, j] ← sum
    else intImg[i, j] ← intImg[i-1, j]+sum
    end if
end for, end for
for i = 0 to w do
 for j = 0 to h do
  x1 ← i-s/2, x2 ← i+s/2, y1 ← j-s/2, y2 ← j+s/2
  count ← (x2-x1)×(y2-y1)
  sum ← intImg[x2,y2]-intImg[x2,y1-1]-
        intImg[x1-1,y2]+intImg[x1-1,y1-1]
  if(in[i,j]×count)≤(sum×(100-t)/100) then
    out[i,j] ← 0
  end if
end for, end for
```

PERSON COUNTING METHOD AND DEVICE FOR SAME

TECHNICAL FIELD

Some embodiments of the present disclosure relate to a method and an apparatus for counting people.

BACKGROUND

The statements in this section merely provide background information related to the present disclosure and do not necessarily constitute prior art.

A known technique for counting people includes separating a foreground and a background from an image based on motion information of an object, tracking an object that is determined to be a person from the separated foreground, and determining the number of tracked objects and directions thereof. This technique works acceptably with a low traffic or a simple background, but suffers from a decreased precision in a complicated environment with a high-traffic, dense population or in a system for monitoring a large area due to the effect of a large number of variables.

In addition, deficiencies of the conventional technique described above include (1) counting people is error-prone due to inaccurate foreground separation with shadow, occlusion or the like, (2) if there are many people passing through, difficulty of separating the objects hinders confirmation of whether or not region (or line) of interest is passed, resulting in failure of counting people, (3) with many people passing through, a large number of objects slows down the processing speed significantly, and (4) a camera lens generates a perspective distortion that wildly fluctuates depending on the camera and the surrounding environment, rendering it difficult to estimate the number of objects by regression.

DISCLOSURE

Technical Problem

Some embodiments of the present disclosure seek to provide a method and an apparatus for counting people, which initiates a detection of circular contours as candidate heads exclusively by a foreground contour crossing a baseline in an image frame, followed by counting the candidate heads that pass through a search area, thus enabling to count the number of people based on the head detection which is more accurate and near error-free.

SUMMARY

In accordance with some embodiments of the present disclosure, a method for counting a number of people by an image analyzing apparatus includes detecting a foreground contour from a current frame input, performing a head detection including defining a baseline virtually at a point perpendicular to a center point of a camera-captured area, defining a search area around the baseline, and detecting, as candidate heads, circular contours to be recognized as heads of people at a point where the foreground contour crosses the baseline, tracking the candidate heads respectively in subsequent frames until the candidate heads pass through the search area, and counting up the number of people by the candidate heads that respectively pass through the search area.

In accordance with some embodiments of the present disclosure, an image analyzing apparatus includes a foreground contour detecting unit, a head detecting unit, a head tracking unit and a counting unit. The foreground contour detecting unit is configured to detect a foreground contour from a current frame inputted. The head detecting unit is configured to define a baseline virtually at a point perpendicular to a center point of a camera-captured area, define a search area around the baseline, and detect, as candidate heads, circular contours to be recognized as heads of people at a point where the foreground contour crosses the baseline. The head tracking unit is configured to track the candidate heads respectively in subsequent frames until the candidate heads pass through the search area. And the counting unit is configured to count up the number of people by the candidate heads that respectively pass through the search area.

Advantageous Effects

According to some embodiments of the present disclosure as described above, a detection of circular contours as candidate heads is initiated exclusively by a foreground contour crossing a baseline in an image frame, followed by counting the candidate heads that pass through a search area, thus enabling counting of people based on the head detection which is more accurate and near error-free.

According to some embodiments of the present disclosure, the number of people can be counted in a more accurate manner by analyzing an image acquired from a camera, which not only can be applied to an image security area for detecting an intrusion, an abnormal situation, or the like, but also can be applied to a business intelligence (BI) area to promptly and accurately analyze a floating population, crowdedness in a store such as a retail store including a department store.

According to some embodiments of the present disclosure, the candidate head is detected only in an area where a head of a person is best detected (a point perpendicular to the center point of a camera-captured area), and then the candidate head is tracked, whereby minimizing the counting error due to an erroneous detection of the head. Further, according to some embodiments of the present disclosure, the detected head is tracked only in a search area that is a part of the image, and hence the processing speed can be increased. In addition, an accurate counting can be provided in an environment where a lot of people move, such as a department store.

REFERENCE NUMERALS

| | |
|---|---|
| 110: Foreground edge detecting unit | 120: Head detecting unit |
| 130: Head tracking unit | 140: Counting unit |

DETAILED DESCRIPTION

Hereinafter, exemplary embodiments of the present disclosure are described in detail with reference to the accompanying drawings.

A method for counting the number of people according to some embodiments of the present disclosure provides an algorithm for counting a number of people based on a head detection in order to solve the problems caused by variables generated in a complicated condition. The method for counting the number of people according to some embodiments roughly includes: (1) defining a baseline virtually at a position where candidate heads of a circular contour are best obtained (i.e., a position perpendicular to the center point of a camera-captured area) and defining a search area around the baseline, (2) performing a detection of the circular contours as the candidate heads at a point where a foreground contour crosses the baseline; and (3) tracking the candidate heads by performing a matching of the candidate heads with a current frame until the detected candidate heads pass through the search area and counting up the number of people by counting the candidate heads taking account of their directions when the candidate heads pass through the search area. Unlike the conventional object tracking, no step of merging and separating objects is performed to reduce an error from a tracking in a complicated situation.

Figure 1A:
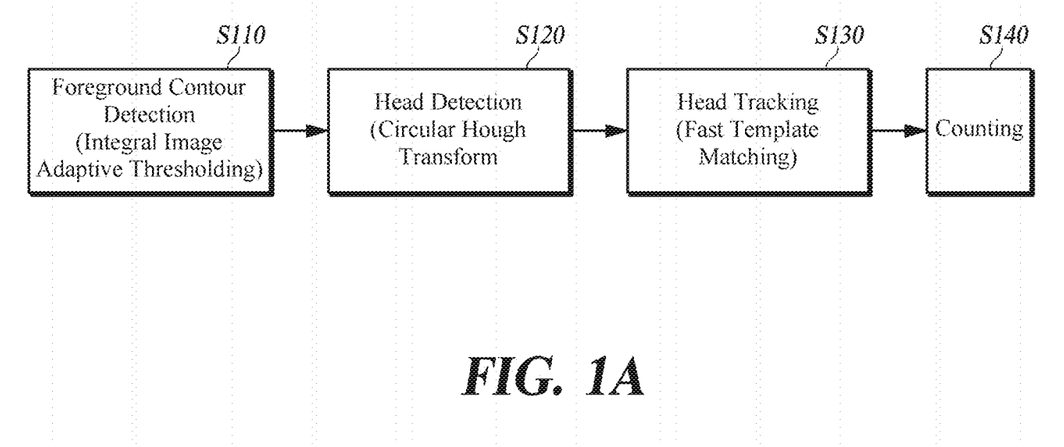
FIG. 1A is a block diagram of a method for counting a number of people based on a head detection according to some embodiments of the present disclosure.

FIG. 1A is a block diagram of the method for counting people based on the head detection according to some embodiments of the present disclosure. The method for counting people includes extracting a foreground contour from a frame inputted (Step S110), detecting circular contours as candidate heads based on the extracted foreground contour (Step S120), tracking the detected candidate heads (Step S130), and counting up the number of people when the detected candidate heads move in a predetermined direction by a predetermined distance or more (Step S140).

Figure 1B:
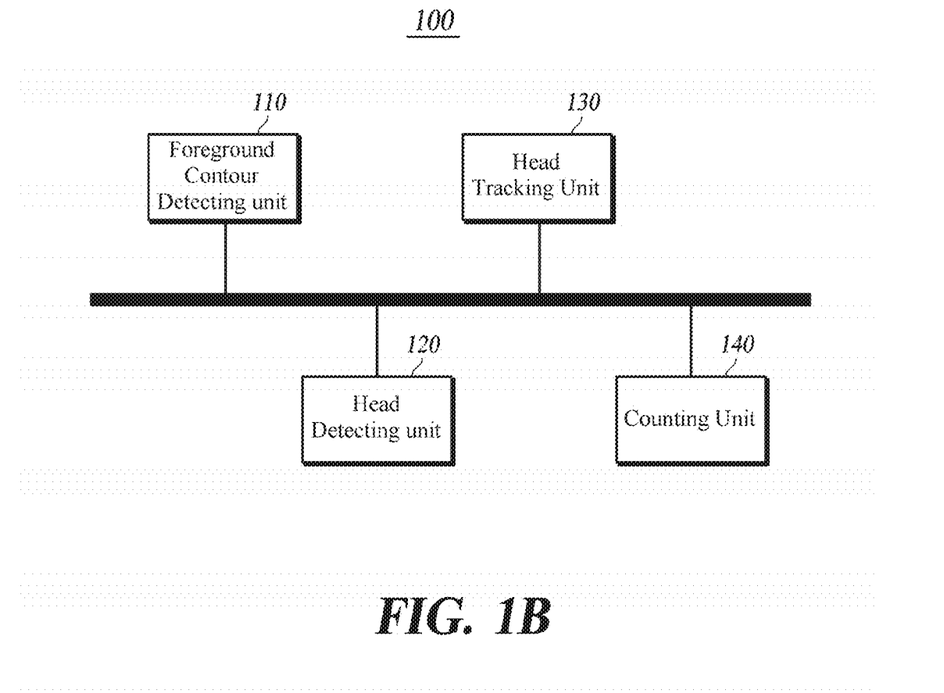
FIG. 1B is a schematic diagram of an image analyzer based on a head detection according to some embodiments of the present disclosure.

The method for counting people shown in FIG. 1A can be implemented by an apparatus shown in FIG. 1B. An image analyzing apparatus 100 shown in FIG. 1B includes a foreground contour detecting unit 110, a head detecting unit 120, a head tracking unit 130 and a counting unit 140. At least one of the constituent elements included in the image analyzing apparatus 100 can be implemented by a software module or a hardware module.

Each of the constituent elements included in the image analyzing apparatus 100 can be connected to a communication bus that interconnects software modules or hardware modules inside the apparatus and can operate in a mutually organizational manner.

When implemented as a hardware module, the image analyzing apparatus 100 may refer to a user terminal such as smart phone, tablet, laptop, PC (personal computer), PDA (personal digital assistant), game console, PMP (portable multimedia player), PSP (PlayStation Portable), wireless communication terminal, TV, media player, and the like. In some embodiments, the image analyzing apparatus 100 corresponds to a server terminal such as an application server, service server and the like. In some embodiments, the image analyzing apparatus 100 may refer to various apparatuses each including: (a) a communication apparatus such as a communication modem and the like for performing communications with various types of devices or a wired/wireless communication networks, (b) a memory for storing various programs and data, and (c) various devices installed with a microprocessor for executing a program so as to perform calculation and controlling, and the like. According to some embodiments, the memory includes a computer-readable recording/storage medium such as a random access memory (RAM), a read only memory (ROM), a flash memory, an optical disk, a magnetic disk, a solid-state disk, and the like. According to some embodiments, the microprocessor is programmed for performing one or more of operations and/or functionality described herein. According to some embodiments, the microprocessor is implemented, in whole or in part, by specifically configured hardware (e.g., by one or more application specific integrated circuits or ASICs).

The foreground contour detecting unit 110 detects a foreground contour from the current frame inputted. The foreground contour detecting unit 110 receives a frame of an image from a camera. Specifically, the foreground contour detecting unit 110 extracts a background contour from the initial frame containing only a background. After extracting an entire contour of the current frame, the foreground contour detecting unit 110 acquires the foreground contour by removing the background contour from the entire contour. The foreground contour detecting unit 110 extracts the foreground contour by using an adaptive thresholding technique based on a frame integral image.

The head detecting unit 120 defines a virtual baseline at a point perpendicular to the center point of a camera-captured area. The head detecting unit 120 further defines a search area around the baseline. The head detecting unit 120 detects circular contours to be recognized as heads of people exclusively at a point the foreground contour crosses the baseline. The head detecting unit 120 extracts the circular contours by performing a circular Hough transform based on the foreground contour. The head detecting unit 120 performs the circular Hough transform by using sizes of the circular contours between a predetermined minimum value and a predetermined maximum value, as prior information.

The head tracking unit 130 tracks the respective candidate heads in the subsequent frame until the candidate heads of the circular contour pass through the search area. When the candidate heads are detected, the head tracking unit 130 determines whether or not each detected candidate head is spatially overlapped with a candidate head existing on a tracking list. When it is determined that the detected candidate head is not spatially overlapped with the candidate head on the tracking list, the head tracking unit 130 newly inserts the detected candidate head in the tracking list.

The head tracking unit 130 calculates a point bearing a strong similarity to the current frame by applying a fast template matching method to every candidate head existing on the tracking list. The head tracking unit 130 determines the point having the strong similarity to the current frame as a new center point for each of the candidate heads.

The head tracking unit 130 determines the search area for performing a process of matching an arbitrary candidate head on the tracking list with the current frame. An operation of the head tracking unit 130 to determine the search area is described below. The head tracking unit 130 calculates a height $R_h$ of the search area based on an upper area $R_u$ of the search area with respect to the respective candidate heads and a lower area $R_d$ of the search area with respect to the respective candidate heads. The head tracking unit 130 sets a width $R_w$ of the search area to a value equal to height $R_h$ of the search area. The head tracking unit 130 determines the search area based on height $R_h$ of the search area and width $R_w$ of the search area.

In the step of calculating height $R_h$ of the search area by the head tracking unit 130, the head tracking unit 130 calculates height $R_h$ based on a first weight $w_\alpha$, a second weight $w_\beta$, an average moving speed S(t) of a t-th candidate head on the tracking list, and up-and-down moving directions $\Delta y(t)$ with respect to the respective candidate heads. Specifically, the head tracking unit 130 calculates average moving speed S(t) of the t-th candidate head on the tracking list based on number N of total trajectories and x-y coordinates $(x_n, y_n)$ of a candidate head of an n-th trajectory.

In the step of calculating up-and-down moving directions $\Delta y(t)$ with respect to the respective candidate heads by the head tracking unit 130, the head tracking unit 130 calculates up-and-down moving directions $\Delta y(t)$ based on total trajectories N and y coordinate $(y_n)$ of a candidate head of the n-th trajectory. The head tracking unit 130 calculates lower area $R_d$ of the search area with respect to the respective candidate heads based on second weight $w_\beta$, average moving speed S(t) of the t-th head candidate on the tracking list and upper area $R_u$ of the search area with respect to the respective candidate heads.

The counting unit 140 counts up a number of people by counting the candidate heads that respectively pass through the search area. The counting unit 140 performs the count-up of the number of people by counting up candidate heads one by one passing through the search area by taking account of the directions of the circular contours thereof.

1. Foreground Contour Detection

The step of detecting the foreground contour (Step S110) is a pre-step to the step of detecting the candidate heads of the circular contour. In Step S110, the entire object contour is extracted from the input current frame. Here, in Step S110, the foreground contour is acquired by excluding the background contour from the entire object contour. Step S110 utilizes the initial frame containing only the background as a reference frame to acquire the foreground contour. Step S110 does not use an ordinary background subtraction technique such as a Gaussian mixture model (GMM) method known for modeling information on the probability of motion differentials, in order to exclude the usage of a motion feature and to increase the processing speed.

Step S110 extracts the contour of the foreground object in a more stable manner regardless of a motion of the object. Step S110 employs an integral image-based adaptive thresholding technique. Some embodiments perform Step S110 taking account of people's heads with a shade in contrast to the background. With the foreground contour detection, Step S110 can take advantage of a darker nature of some people's heads. The adaptive thresholding technique uses the integral image while comparing a central pixel with the average of peripheral pixels.

Figure 2:
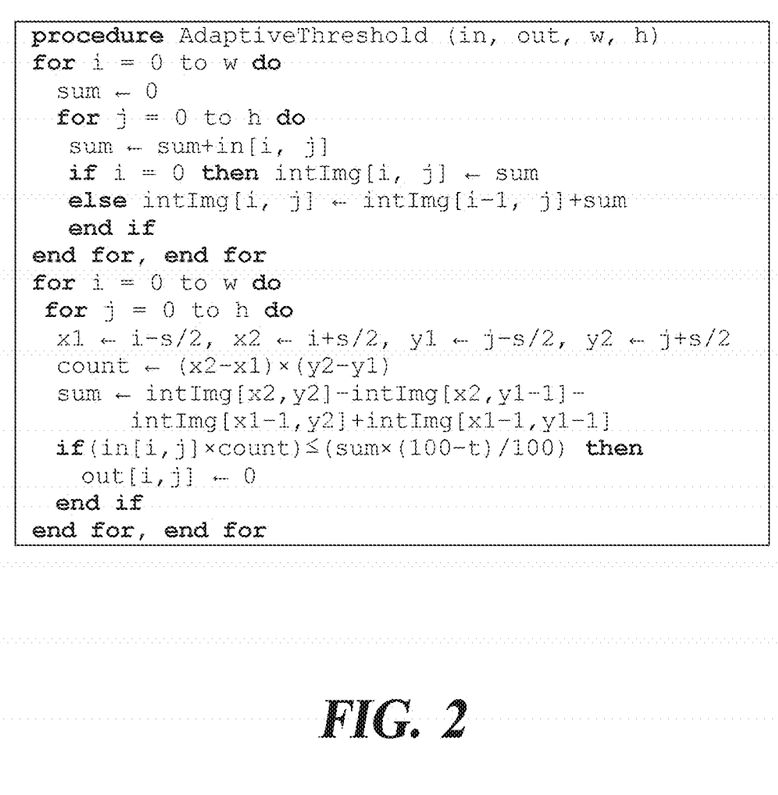
FIG. 2 is a schematic diagram of pseudo codes of an integral image-based adaptive thresholding process according to some embodiments of the present disclosure.
Figure 3:
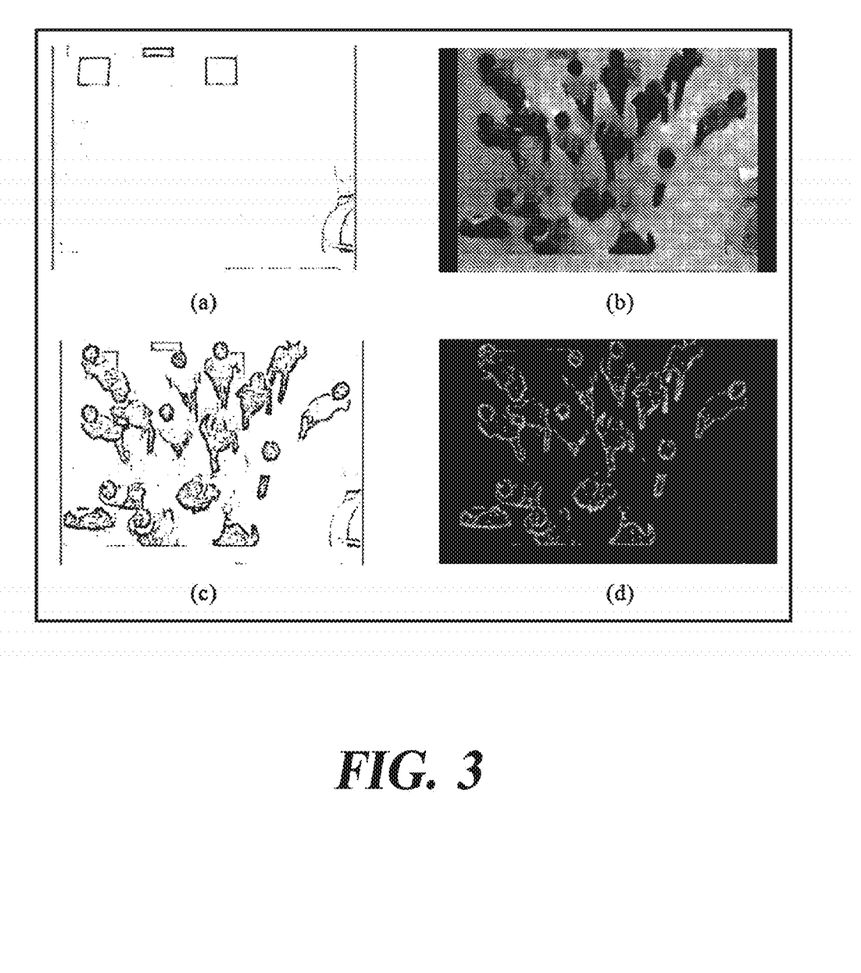
FIG. 3 is an exemplary schematic diagram illustrating a foreground contour extraction in some embodiments of the present disclosure.

FIG. 2 is a schematic diagram of pseudo codes of the adaptive thresholding process according to some embodiments of the present disclosure. This adaptive thresholding process is different from conventional methods, where the image is not binarized but original pixels are kept intact in a certain portion having a stark difference from the surrounding with the rest being removed. Step S110 extracts the contour from the image to which the adaptive thresholding technique is applied. Step S110 obtains the foreground contour $(E_f(i)=E(i)-E_b)$ by subtracting the background contour $(E_b)$ from the contour (E(i)) of the current (i-th) frame. FIG. 3 is a schematic diagram illustrating a foreground contour extraction in some embodiments of the present disclosure.

2. Contour Feature-Based Head Detection

In the step of detecting a candidate head (Step S120), a circular Hough transform is performed based on the foreground contour detected by the step of detecting the foreground contour (Step S110) to extract the candidate heads by the circular contours. Step S120 is to count the number of people from an image captured by a fixed camera. Despite the camera lens causes a distortion in a peripheral area, humans have generally comparable body sizes. That is, a human body size is determined by the size of the candidate head. The candidate head size is a primary piece of prior information. In response to candidate head size ($S_{head}$) being in a range between a minimum value ($S_{head\_min}$) and a maximum value ($S_{head\_max}$), Step S120 may utilize the circular Hough transform for limiting the size of the circular contour to be detected to the corresponding range.

Figure 4:
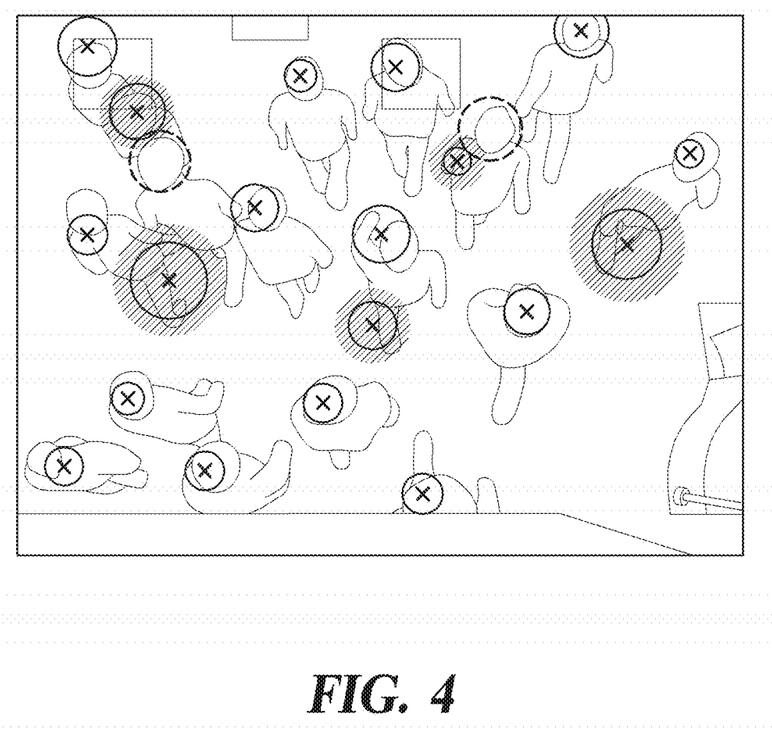
FIG. 4 is an exemplary schematic diagram illustrating a head detection in some embodiments of the present disclosure.

FIG. 4 is a schematic diagram illustrating a head detection in some embodiments of the present disclosure. As shown in FIG. 4, five erroneous detections (hatched areas shown in FIG. 4) might occur from human body parts other than the candidate heads of the total 16 people in a ground truth. Further, two detection misses (broken-lined areas shown in FIG. 4) are assumed to have occurred. The distortion by the camera is often responsible for the erroneous detection to occur from an extraction of contour information close to a circular shape of a human body part. The detection misses may have occurred from a decreased contrast of the head area with a dark-colored outfit of the wearer, leading to a failed extraction of the circular contour.

3. Tracking of Head Based on Movement Speed

In order to minimize the possibilities of the erroneous detection and the detecting miss that can occur in the above-mentioned manner, Step S130 for tracking the detected candidate heads accompanies detecting the circular contours to be recognized as the candidate heads exclusively on a floor perpendicular to the center of the camera view. Step S130 continues to track the detected circular contours over the subsequent frames.

Figure 5:
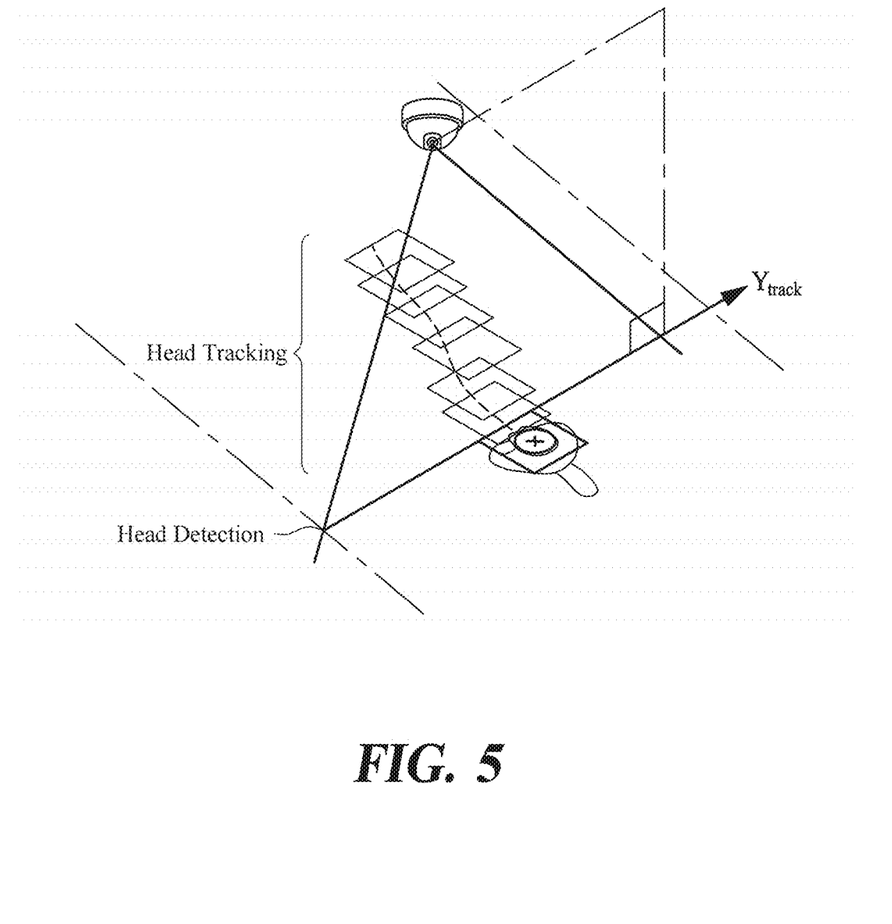
FIG. 5 is a schematic diagram illustrating a setting of a reference point for the head detection and tracking according to some embodiments of the present disclosure.

FIG. 5 is a schematic diagram illustrating a method for tracking a detected candidate head on a virtual tracking baseline ($Y_{track}$) in subsequent frames. When the candidate head tracking in Step S130 has the candidate heads detected by the circular contours, each candidate head is checked whether or not it spatially overlaps a candidate head existing on a tracking list containing candidate heads that are currently tracked. When the checking finds a candidate head that is non-overlapping with a candidate head on the tracking list, the non-overlapping candidate head is newly added by Step S130 to the tracking list. Thereafter, Step S130 applies a fast template matching method to all candidate heads on the tracking list, to determine such points that bear a high similarity to the current frame as new center points of the respective candidate heads.

Figure 6:
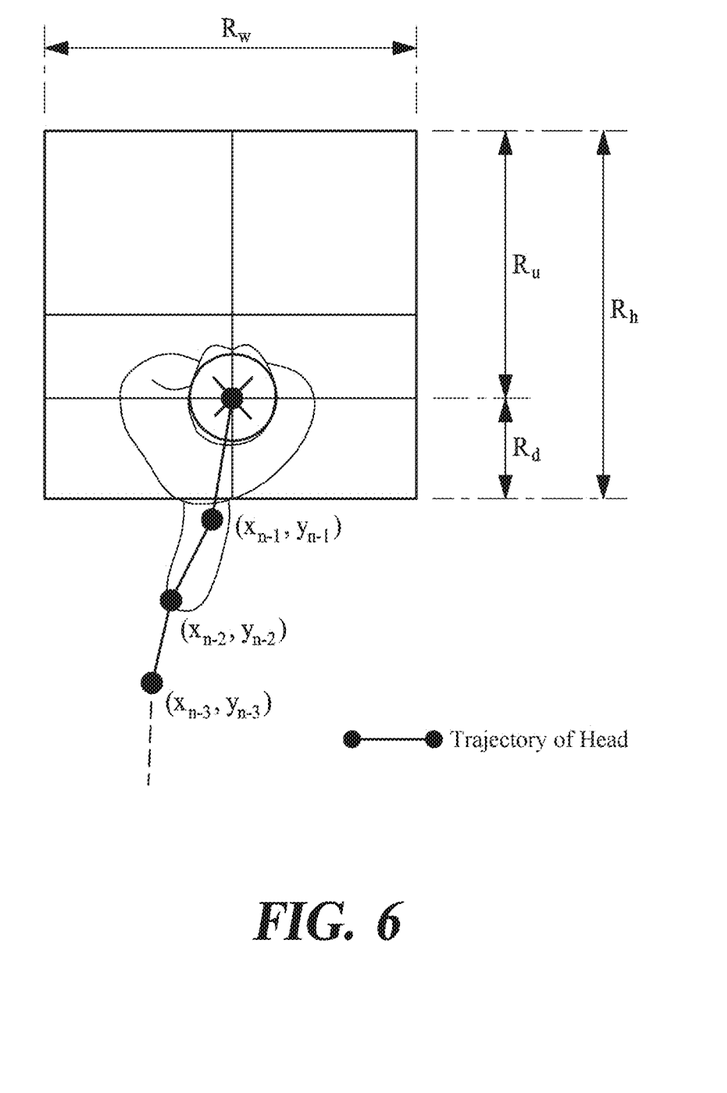
FIG. 6 is a schematic diagram illustrating a determination of a fast template matching (FMT) area according to some embodiments of the present disclosure.

FIG. 6 is a schematic diagram illustrating a determination of an area for performing the matching operation in the current frame to an arbitrary candidate head on the tracking list. The fast template matching area is represented by $R_w \times R_h$ area. $R_w$ denotes a width of a margin of the search area. $R_h$ denotes a height of the margin of the search area, where $R_h=R_u+R_d$. $R_u$ denotes an upper area of the search area with reference to the candidate head. $R_d$ denotes a lower area of the search area with reference to the candidate head. In some embodiments, $R_w$ is set to be equal to $R_h$. In some embodiments, $R_w$ is set to be different from $R_h$. With $R_w$ set to be different from $R_h$, $R_h=R_l+R_r$, where $R_l$ denotes a left area of the search area with reference to the candidate head and $R_r$ denotes a right area of the search area with reference to the candidate head.

In the step of tracking the candidate head (Step S130), $R_u$ and $R_d$ are calculated from Equation 1 to Equation 4 based on a trajectory stored in the tracking list.

$$S(t) = \frac{1}{N-1} \cdot \sum_{n=1}^{N-1} \left( \sqrt{(x_n - x_{n-1})^2 + (y_n - y_{n-1})^2} \right) \quad \text{Equation 1}$$

S(t) denotes an average moving speed that equals to the number of pixels moved/frame 0 (i.e., the number of frames) of the t-th candidate head on the tracking list. N denotes the number of total trajectories. The total N trajectories are stored in a storage unit. $(x_n, y_n)$ denotes x, y coordinates centered about a candidate head in the n-th trajectory.

$$\Delta y(t) = \frac{1}{N-1} \cdot \sum_{n=1}^{N-1} (y_n - y_{n-1}) \quad \text{Equation 2}$$

$\Delta y(t)$ denotes an upward moving direction and a downward moving direction, representing an average direction of the N trajectories. N denotes the number of total trajectories which are stored in a storage unit. $y_n$ means a y coordinate centered about a candidate head of the n-th trajectory.

Based on S(t) calculated from Equation 1 and $\Delta y(t)$ calculated from Equation 2, the upper area $R_u(t)$ of the search area with reference to the t-th candidate head is calculated from Equation 3.

$$R_u(t) = \begin{cases} w_\beta \cdot w_\alpha \cdot S(t), & \Delta y(t) \geq 0 \\ w_\beta \cdot (1 - w_\alpha) \cdot S(t), & \text{otherwise} \end{cases} \quad \text{Equation 3}$$

In the calculation of the upper area $R_u(t)$ of the search area for the t-th candidate head based on S(t) calculated from [Equation 1] and $\Delta y(t)$ calculated from Equation 2, $w_\alpha$ (first weight) is a real number value in a range of $0.5 \leq w_\alpha \leq 1$, which is meant to apply a weight to a direction aligned with the direction of an average moving trajectory. $w_\beta$ (second weight) is a real number value in a range of $w_\beta \geq 1$, which means a value of a weight for the margin of the search area compared to a moving trajectory. S(t) denotes an average moving speed that equals to the number of pixels moved/frame 0 (i.e., the number of frames) of the t-th candidate head on the tracking list. $\Delta y(t)$ denotes an average direction of N trajectories, i.e., an upward moving direction and a downward moving direction.

Based on $R_u(t)$ determined from Equation 3, $R_d(t)$ can be obtained from Equation 4.

$$R_d(t) = w_\beta \cdot S(t) - R_u(t) \quad \text{Equation 4}$$

$R_d(t)$ denotes a calculated lower area of the search area with reference to the t-th candidate head based on S(t) calculated from Equation 1 and $R_u(t)$ calculated from Equation 3. S(t) denotes the average moving speed that equals to the number of pixels moved/frame 0) of the t-th candidate head on the tracking list. $R_u(t)$ denotes the calculated upper area of the search area with reference to the t-th candidate head based on S(t) and $\Delta y(t)$.

Figure 7A:
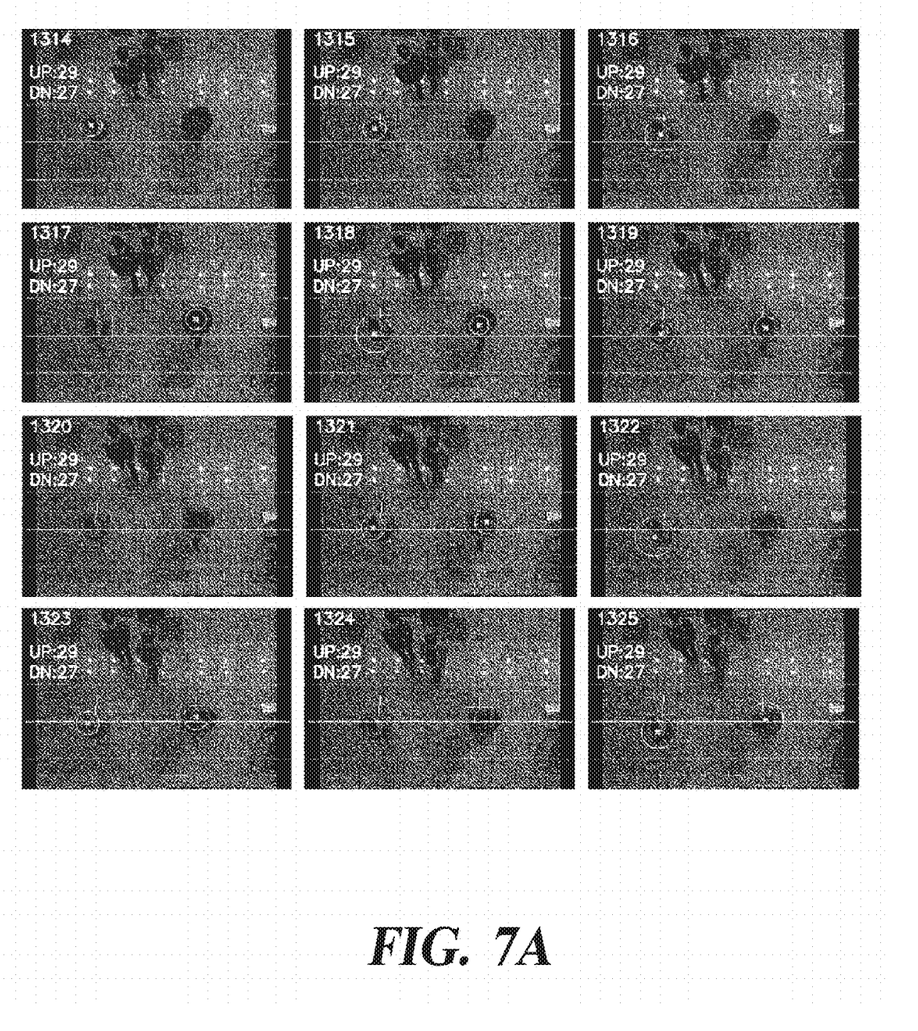
FIGS. 7A and 7B are exemplary schematic diagrams respectively illustrating head detecting and head tracking operations over successive frames according to some embodiments of the present disclosure.
Figure 7B:
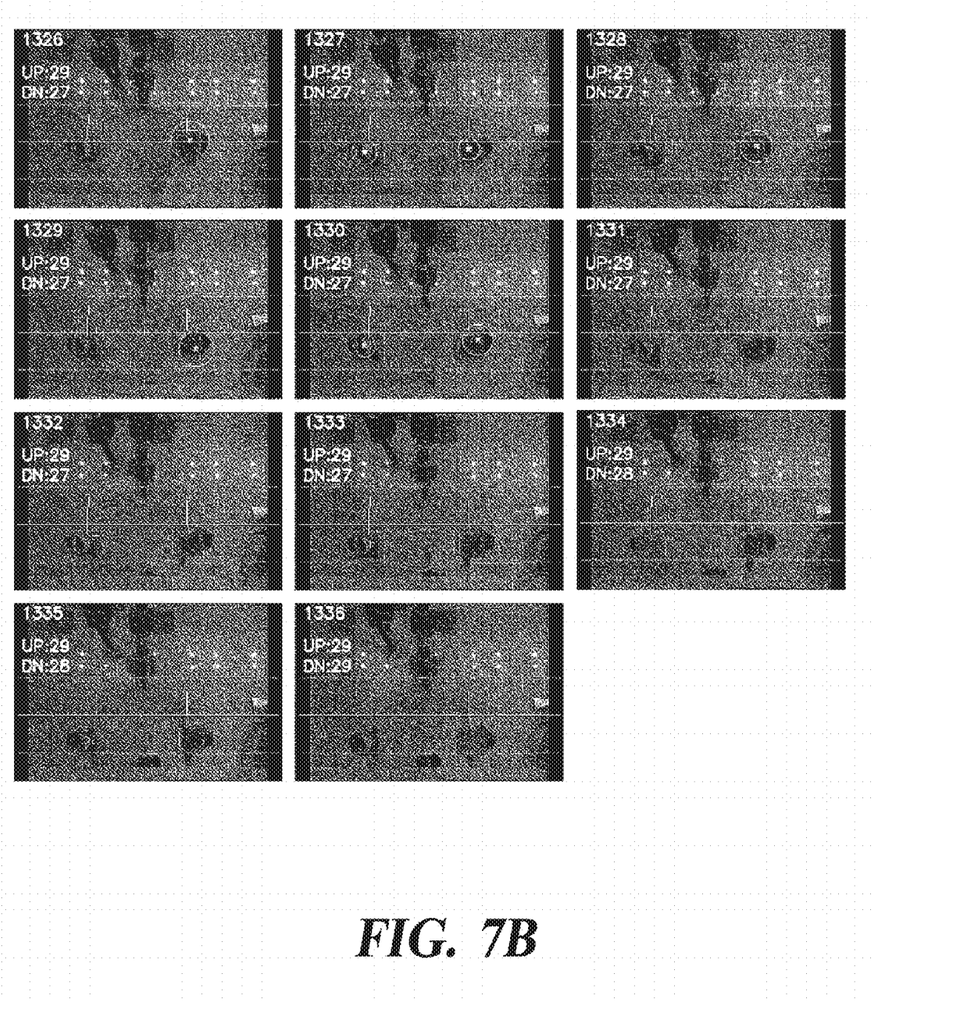

FIGS. 7A and 7B are exemplary schematic diagrams respectively illustrating head detecting and head tracking operations over successive frames according to some embodiments. The detection of the candidate heads (circular contours) was accounted for exclusively on the condition that $Y_{track}=150$ and that the candidate head intersects with the tracking baseline. As shown in FIGS. 7A and 7B, there are some frames failing to detect the candidate heads (circular contours) even when they intersected with the tracking baseline, such as a 1320-th frame and a 1324-th frame. Going on to track the candidate heads (circular contours) extracted successfully from the previous frames had resulted in two people counted up from a 1334-th frame and a 1336-th frame.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

INDUSTRIAL APPLICABILITY

As described above, the present disclosure is highly useful for application in the fields of video security and BI (Business Intelligence) for enabling to count the number of people based on the head detection which is more accurate and near error-free.

CROSS-REFERENCE TO RELATED APPLICATION

This application claims priority under 35 U.S.C §119(a) of Patent Application No. 10-2014-0021381, filed on Feb. 24, 2014 in Korea, the entire content of which is incorporated herein by reference. In addition, this non-provisional application claims priority in countries, other than the U.S., with the same reason based on the Korean patent application, the entire content of which is hereby incorporated by reference.

The invention claimed is:

1. A method performed by an image analyzing apparatus for counting a number of people, the image analyzing apparatus comprising one or more application specific integrated circuits (ASICs) to implement a microprocessor to execute the method comprising:
  detecting a foreground contour from a current frame inputted;
  performing a head detection, comprising:
    defining a baseline virtually at a point perpendicular to a center point of a camera-captured area,
    defining a search area around the baseline, and
    detecting, as candidate heads, circular contours to be recognized as heads of people at a point where the foreground contour crosses the baseline;

tracking the candidate heads respectively in subsequent frames until the candidate heads pass through the search area; and outputting the number of people by counting up the recognized heads of people based on a tracking list and the tracked candidate heads that respectively pass through the search area, wherein the ASICs implements the microprocessor to further execute generating the tracking list containing candidate heads, and wherein the tracking of the candidate heads comprises:

determining whether a candidate head detected by the tracking is spatially overlapped with at least one of the candidate heads on the tracking list; and if not spatially overlapped, newly inserting the non-overlapped candidate heads into the tracking list.

2. The method of claim 1, wherein the tracking of the candidate heads comprises:

applying a fast template matching method to the candidate heads on the tracking list and thereby determining a point bearing a strong similarity to the current frame as a new center point for each of the candidate heads.

3. The method of claim 1, wherein the tracking of the candidate heads comprises:

determining the search area for performing a process of matching an arbitrary candidate head on the tracking list with the current frame.

4. The method of claim 1, wherein the tracking of the candidate heads comprises:

calculating a height ($R_h$) of the search area based on an upper area ($R_u$) of the search area with respect to respective candidate heads and a lower area ($R_d$) of the search area with respect to the respective candidate heads, setting a width ($R_w$) of the search area to a value equal to the height ($R_h$) of the search area, and determining the search area based on the height ($R_h$) and the width ($R_w$) of the search area.

5. The method of claim 4, further comprising generating a tracking list containing candidate heads, and wherein the tracking of the candidate heads comprises:

calculating the height ($R_h$) of the search area based on a first weight ($w_\alpha$), a second weight ($w_\beta$), an average moving speed ($S(t)$) of a t-th candidate head on the tracking list, and up-and-down moving directions ($\Delta y(t)$) with respect to the respective candidate heads.

6. The method of claim 5, wherein the tracking of the candidate heads comprises:

calculating the average moving speed ($S(t)$) of the t-th candidate head on the tracking list based on a number (N) of total trajectories and x-y coordinates ($x_n$, $y_n$) of a candidate head of an n-th trajectory.

7. The method of claim 5, wherein the tracking of the candidate heads comprises:

calculating the up-and-down moving directions ($\Delta y(t)$) with respect to the respective candidate heads based on a number (N) of total trajectories and a y coordinate ($y_n$) of a candidate head of an n-th trajectory.

8. The method of claim 4, further comprising generating a tracking list containing candidate heads, and wherein the tracking of the candidate heads comprises:

calculating the lower area ($R_d$) of the search area with respect to respective candidate heads based on a second weight ($w_\beta$), the average moving speed ($S(t)$) of the t-th candidate head on the tracking list, and the upper area ($R_u$) of the search area with respect to the respective candidate heads.

9. The method of claim 8, wherein the tracking of the candidate heads comprises:

calculating the average moving speed ($S(t)$) of the t-th candidate head on the tracking list based on a number (N) of total trajectories and x-y coordinates ($x_n$, $y_n$) of a candidate head of an n-th trajectory.

10. The method of claim 8, wherein the tracking of the candidate heads comprises:

calculating the height ($R_h$) of the search area based on a first weight ($w_\alpha$), a second weight ($w_\beta$), an average moving speed ($S(t)$) of a t-th candidate head on the tracking list, and up-and-down moving directions ($\Delta y(t)$) with respect to the candidate heads.

11. The method of claim 1, wherein the detecting of the foreground contour comprises:

extracting a background contour from a initial frame containing only a background, extracting an entire contour of the current frame, and removing the background contour from the entire contour to acquire the foreground contour.

12. The method of claim 11, wherein the detecting of the foreground contour comprises:

extracting the foreground contour by using an adaptive thresholding process based on a frame integral image.

13. The method of claim 1, wherein the performing of the head detection comprises:

extracting the circular contours by performing a circular Hough transform based on the foreground contour.

14. The method of claim 13, wherein the performing of the head detection comprises:

performing the circular Hough transform by using sizes of the circular contours between a predetermined minimum value and a predetermined maximum value, as prior information.

15. The method of claim 1, wherein the counting up comprises:

counting up the candidate heads one by one passing through the search area by taking account of directions of the circular contours.

16. An image analyzing apparatus comprising one or more application specific integrated circuits (ASICs) to implement:

a foreground contour detecting unit configured to detect a foreground contour from a current frame inputted;

a head detecting unit configured to define a baseline virtually at a point perpendicular to a center point of a camera-captured area, define a search area around the baseline, and detect, as candidate heads, circular contours to be recognized as heads of people at a point where the foreground contour crosses the baseline;

a head tracking unit configured to track the candidate heads respectively in subsequent frames until the candidate heads pass through the search area; and a counting unit configured to outputting a number of people by counting up the recognized heads of people based on a tracking list and the tracked candidate heads that respectively pass through the search area, wherein the ASICs further implements the head tracking unit configured to generate the tracking list containing candidate heads, and wherein the ASICs further implements the head tracking unit configured to track the candidate heads by determining whether a candidate head detected by the tracking is spatially overlapped with at least one of the candidate heads on the tracking list; and inserting, if not spatially overlapped, the nonoverlapped candidate heads into the tracking list.

17. The image analyzing apparatus of claim 16, wherein the ASICs further implements the head tracking unit configured to track the candidate heads by applying a fast template matching method to the candidate heads on the tracking list and thereby determining a point bearing a strong similarity to the current frame as a new center point for each of the candidate heads.

18. The image analyzing apparatus of claim 16, wherein the ASICs further implements the head tracking unit configured to track the candidate heads by determining the search area for performing a process of matching an arbitrary candidate head on the tracking list with the current frame.

19. The image analyzing apparatus of claim 16, wherein the ASICs further implements the head tracking unit configured to track the candidate heads by calculating a height ($R_h$) of the search area based on an upper area ($R_u$) of the search area with respect to respective candidate heads and a lower area ($R_d$) of the search area with respect to the respective candidate heads, setting a width ($R_w$) of the search area to a value equal to the height ($R_h$) of the search area, and determining the search area based on the height ($R_h$) and the width ($R_w$) of the search area.

* * * * *